Patented Nov. 28, 1933

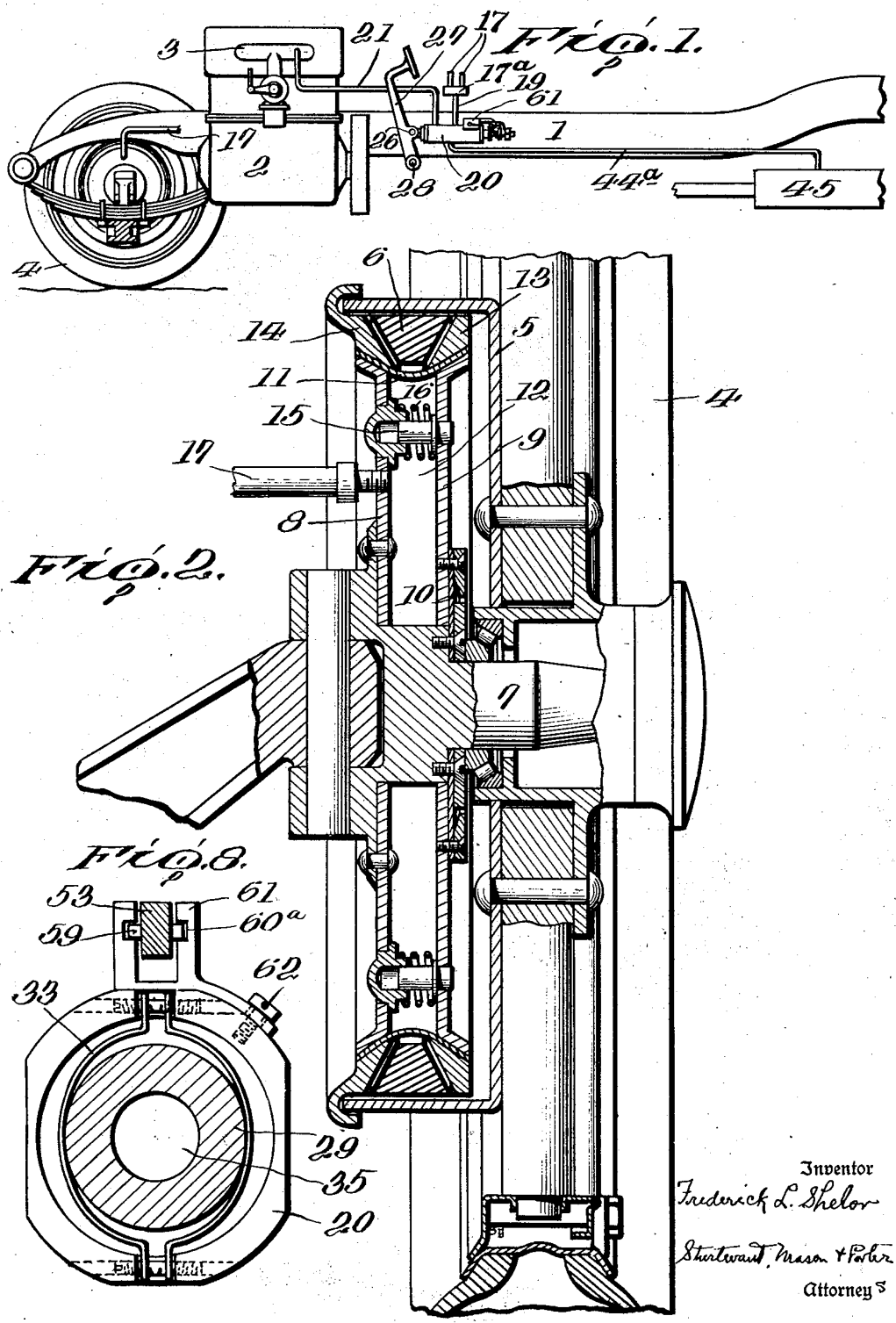

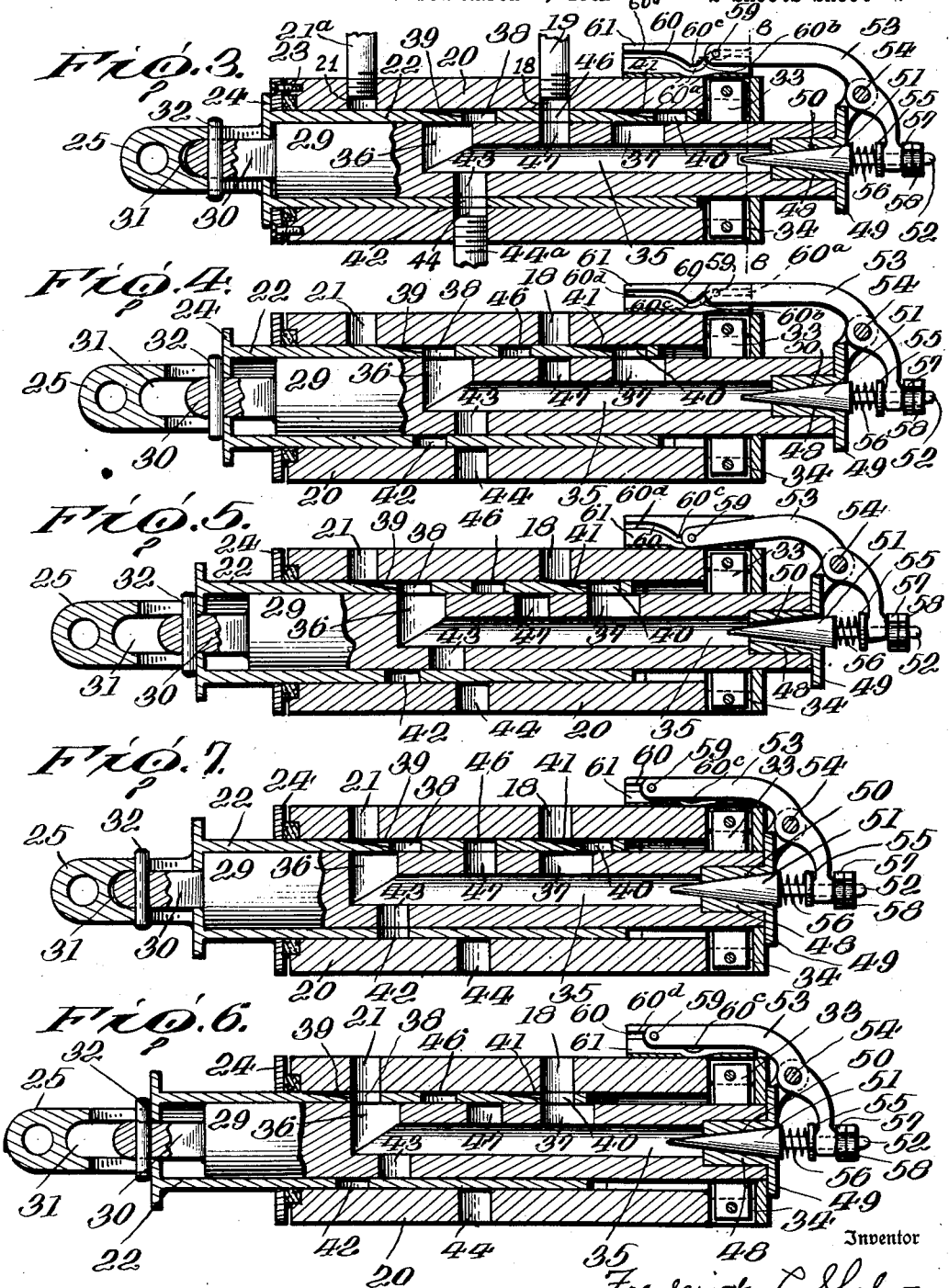

1,937,444

UNITED STATES PATENT OFFICE 1,937,444

VACUUM-CONTROLLED BRAKING MECHANISM FOR MOTOR-OPERATED VEHICLES

Frederick L. Shelor, Richmond, Va., assignor to Innovation Brakes, Inc., Richmond, Va., a corporation of Virginia Application March 7, 1932. Serial No. 597,358

14 Claims. (Cl. 188—152)

The invention relates to new and useful improvements in a braking mechanism for a rotated member, and more particularly the wheels of a motor-operated vehicle.

An object of the invention is to provide a braking mechanism which is vacuum controlled, and wherein the degree of vacuum on the chamber operating the braking means for the rotating part may be varied at will and maintained substantially constant at the degree of vacuum selected.

A further object of the invention is to provide a braking mechanism of the above type wherein the degree of vacuum on the chamber may be decreased without completely releasing the braking means.

A still further object of the invention is to provide a braking mechanism of the above type wherein the degree of vacuum on the chamber operating the braking means for the rotating part is controlled by a manually shiftable valve member, and wherein means is associated with said valve member for maintaining the degree of vacuum on the chamber and the pressure on the braking means substantially constant for the selected positioning of the valve.

A still further object of the invention is to provide a braking mechanism of the above type wherein the chamber placed under vacuum and operating the braking means is connected to the vacuum creating means and to the atmosphere through a manually controlled mechanism operating to vary the size of the opening leading to the atmosphere as the size of the opening leading to the suction creating means is varied, so that varying degrees of vacuum may be created on said chamber substantially throughout the range of action of the valve controlling mechanism.

A still further object of the invention is to provide a braking mechanism of the above type wherein the vacuum chamber controlling the braking means may be connected to the atmosphere for completely releasing the braking means after the connection between the chamber and the vacuum creating means has been closed.

These and other objects will in part be obvious and will in part be hereinafter more fully disclosed.

In the drawings—

Figure 1 is a view showing diagrammatically a portion of an automobile with the improved braking mechanism applied thereto;

Fig. 2 is a sectional view through one of the wheels, and showing the control of the braking members by a chamber which is placed under vacuum;

Fig. 3 is a longitudinal sectional view through the control valve mechanism located intermediate the chambers operating the brakes and the vacuum creating means, the valves being in closed position and the chambers vented to the atmosphere releasing the brakes;

Fig. 4 is a view similar to Fig. 3, but showing the valves shifted so that the chamber operating the brake is closed to the atmosphere preparatory to the placing of said chamber under vacuum for applying the brake;

Fig. 5 is a view similar to Fig. 4, but showing the valves shifted so as to apply a vacuum to the chamber operating the brake and so as to maintain said chamber under a constant degree of vacuum at the selected setting of the valves;

Fig. 6 is a view similar to Fig. 5, but showing the valves positioned so that the chamber applying the brakes is subjected to the full vacuum pull of the vacuum creating means;

Fig. 7 is a view similar to Fig. 6, but showing the valves shifted to a position for decreasing the vacuum on the chamber and without completely releasing the brakes; and Fig. 8 is a sectional view on the line 8—8 of Fig. 3 showing the control cam and also showing the friction holding means for the inner member of the valve mechanism.

The invention has to do with a vacuum controlled braking mechanism for a rotating part. The invention is illustrated as applied to a braking mechanism for a motor-operated vehicle, and it will be so described, but it is understood that the invention is not limited to this application, but may be used in connection with rotating parts generally where it is desired to apply varying selected brake pressures, and maintain said selected pressure substantially constant. The motor vehicle preferably is provided with a brake drum at each wheel, with which brake drum is associated a vacuum chamber having a movable wall operating, when shifted, to apply a braking pressure to a member carried by said drum. An intake manifold is preferably used as a vacuum creating means, as the vacuum on said intake manifold is sufficiently constant and of sufficient degree with my improved brake applying devices to obtain the desired braking pressure on the wheels. Between the vacuum chamber operating the braking means and the intake manifold is a control valve mechanism which is connected to the foot pedal so that the valves thereof may be shifted to different set positions. This control valve mechanism includes a casing having a port connected to the intake manifold, and a port connected to the vacuum chambers at the wheels. Within this casing is a sliding member which provides a control valve for the port leading to the intake manifold and the port leading to the chambers at the wheels. The casing is also provided with an opening leading to the atmosphere or to the intake manifold, and this sliding member has a valve which controls this port. The purpose of this port leading to the atmosphere is for completely releasing the chambers at the wheels for releasing the brakes. The sliding member is in two sections, and the inner section is provided with a chamber which forms the connection from one port to another upon the opening of the valves. There is also a vent opening leading from this central chamber to the atmosphere and a valve for controlling the same. This valve, as shown, is in the form of a metering pin for regulating the size of the vent opening.

It is thought that the invention will be better understood by a detail description of the illustrated embodiment thereof. In Fig. 1 of the drawings, a portion of an automobile chassis is indicated at 1, the engine is indicated at 2, and the intake manifold of the engine is indicated at 3. One of the wheels is indicated at 4. These parts are all diagrammatically shown. One of the front wheels is illustrated in Fig. 2 of the drawings. This wheel includes a brake drum 5 which is attached to and rotates with the wheel. Said drum carries a braking member 6 which is attached to the drum so as to rotate with the drum, but which is free to move axially of the wheel. The wheel is mounted for rotation on a spindle 7. Fixed to the hub of the spindle 7 is a disk 8. Also mounted on the hub of the spindle is a disk 9. This disk 9 is free to move axially of the spindle. A flexible member 10 is connected to the disk 9 and to the hub of the spindle. A flexible member 11 is connected to the disk 8 and the disk 9, and this forms a chamber 12 which is closed and which constitutes the vacuum chamber for operating the brake members. Connected to the disk 9 is a brake shoe 13. Connected to the disk 8 is a brake shoe 14. The disk 9 carries pins 15 engaging sockets or recesses in members carried by the disk 8, and this holds the disk 9 from rotation, while permitting the same to move toward and away from the disk 8. There are a series of these pins 15, and surrounding each pin is a spring 16 which operates to separate the disks when the chamber 12 is vented to the atmosphere. When this chamber is placed under a vacuum, then there is a differential pressure on the disk 9 due to the atmospheric pressure on the outer face thereof, which forces the disk 9 toward the disk 8, and this will force the brake shoe 13 into contact with the braking member 6 on the drum, and also force the braking member 6 into contact with the brake shoe 14. Thus it is that the braking member 6 is gripped between the two brake shoes, and the extent of braking pressure applied by the brake shoes to this member 6 will be determined by the degree of vacuum on the chamber 12.

It will be noted that the chamber 12 extends all the way from the brake shoes to the hub of the spindle carrying the wheel. This provides a very large area in the disk 9 which is subjected to the differential pressure between that on the vacuum chamber and the atmospheric pressure on the outer face of the disk. Furthermore, inasmuch as the shoe 13 is mounted directly on the disk 9, the distance between the disks 8 and 9 is only limited by the necessary thickness of the braking member 6 and the spring which separates the members. Therefore, the disks 8 and 9 may be placed very close together and the capacity of the vacuum chamber reduced to a minimum without reducing the effective surface subjected to the differential pressure which operates the braking members. The specific form of brake applying means is shown, described and claimed in my co-pending application Serial No. 572,705, filed November 2, 1931, and further description thereof is not thought necessary.

Between the brake chambers at the wheels and the intake manifold is a valve mechanism which includes a casing 20. A pipe 17 is connected to the vacuum chamber at each wheel and to a header 17a (see Fig. 1). There is a port 18 in the casing 20, and a pipe 19 leading from the header is connected to this port 18. There is also a port 21 in the casing, and a pipe 21a connected thereto is also connected to the manifold 3. Within the casing 20 is a sliding member formed in two sections; a sleeve 22 and a central member 29. A packing 23 is provided between the casing and the sleeve 22. Attached to the sleeve 22 is a head 24 which overlies the end of the casing, and this head is provided with a projecting arm 25 which is pivoted at 26 to the foot pedal 27. The foot pedal 27 is pivoted at 28, and this connection 26 is of such a character as to permit the sleeve to be moved endwise in the casing 20 upon depressing the pedal 27. There is, of course, the usual spring associated with this pedal which returns it to raised position when released by the foot of the operator. It will be understood that other means than a foot pedal may be provided for shifting this sleeve member 22. The sleeve member 22 is provided with an opening 38 therethrough, and with a cut-away portion 39 on its outer face, and the sleeve in the region of this cut-away portion 39 and opening 38 forms a control valve for controlling the extent of opening of the port 21. There is a similar opening 40 in the sleeve and a cut-away portion 41, and the portion of the sleeve in the region of this cut-away portion and the opening 40 provides a control valve for the port 18. The central member 29 is provided with a chamber 35 extending longitudinally of said member. There is an opening 36 extending from the chamber 35 to the outer face of said member 29, and this opening is always in communication with the opening 38 in the sleeve 22. There is an opening 37 likewise leading from the chamber 35 to the outer face of the member 29, and this opening is always in communication with the opening 40 in the sleeve 22.

There is a port 44 in the valve casing to which a pipe 44a is connected. This pipe, as shown in Fig. 1, is also connected to the muffler 45. The sleeve 22 is provided with an opening 42 and the member 29 has an opening 43. The portion of the sleeve 22 in the region of the opening 42 serves as a control valve for the port 44. When the ports are in the position shown in Fig. 3, then the openings 42 and 43 are in alinement with the port 44, and there is an open connection between the chamber 35 and the atmosphere through the muffler. When, however, the parts are moved to the position shown in Fig. 4, the sleeve control valve 22 has closed the port 44 so as to close this opening to the atmosphere from the chamber 35. There is an opening 47 leading from the chamber 35 to the outer face of the member 29, and when the port 44 is open, the opening 47 is in alinement with an opening 46 in the sleeve 22, and these openings are in alinement with the port 18, so that all of the chambers at the wheels are connected to the chamber 35, and the chamber 35, through the port 44, is connected to the atmosphere through the muffler. This will completely release the brakes.

The member 29 is provided with a stem 30 which projects into a recess 31 in the arm 25. A pin 22 extending through this stem 30 slides in recesses in the arm 25 and has a limited movement therein. When the sleeve 22 is moved to the left, as viewed in Fig. 3, the member 29 will not be moved until the pin contacts with the head 24 as shown in Fig. 4. On the other hand, when the parts are in the position as shown in Fig. 6, and the sleeve 22 is moved to the right, the member 29 will not be moved until the pin contacts with the outer ends of the slots. Surrounding the cylindrical member 29 are frictional clamping members 33 which are secured together by suitable holding members. These clamping members project into recesses 34 formed in the casing 20, and this holds the clamping members from movement endwise of the casing, and causes the cylindrical member 29 to slide therein under frictional restraint when the pin 32 contacts with the head 24 and said head is moved to the left as viewed in Figures 3 and 4. Likewise, when the pin 32 contacts with the outer end of the slot, it will be forcibly moved with the sleeve 22, when said sleeve is moved to the right.

Fixed to the member 29 is a member 48 having a flanged head 49. This member 29 has a tapered opening 50 therethrough. A valve is provided for this opening 50, and as shown in the drawings is in the form of a metering pin 51 which is tapered and extends into the opening 50 so as to fit and close the opening when moved to the limit into the opening. This valve 51 is provided with a stem 52. A lever 53 is pivoted at 54 to a bracket lug carried by the head 49 of the member 48. This lever is forked at its lower end so as to straddle the stem 52. The lever bears against a washer 55 at the inner face thereof, and between the washer and the head 49 is a spring 56. A nut 57 bears against the outer face of the lever and is held in position by a lock nut 58. The lever 53 at its other end carries a pin 59 running in a cam groove 60 in a block 61 secured to the casing 20. This block is held in a set position on the casing by a clamping screw 62 passing through a slot in the block. This clamping screw permits the block to be shifted endwise of the casing. The cam groove 60 has a horizontal portion 60a which leads to a downwardly inclined portion 60b, thence to an upwardly inclined portion 60c and a straight horizontal portion 60d. When the pin is in the horizontal portion 60a, the valve 51 is shifted inwardly so as to close the opening through the sleeve. This opening controlled by the valve 51 and connected to the chamber 35, serves as a vent opening for the chamber 35 to the atmosphere, and the purpose of the valve 51 is to adjust or determine the extent of the opening, and therefore, the amount of air that will pass in by the valve into the chamber 35.

When the sleeve 22 is positioned as shown in Fig. 3, the port leading to the vacuum creating apparatus is closed, and the vacuum chambers at each wheel are directly connected through the port 44, which is open, to the muffler, and thus to the atmosphere, and the brakes are fully released. When the foot pedal is depressed a very slight distance, the sleeve 22 will be shifted to the position shown in Fig. 4. The member 29 has not been shifted, and the valve 51 remains closed. This shifting of the sleeve will, however, cause the valve controlling the port 44 to close the same, and now the chamber 35 is completely closed to the atmosphere. The brakes, however, are still released, and therefore, the movement of the pedal by the operator for a very short distance will not, in any way, operate to apply the brakes. When the sleeve 22 is shifted to the position shown in Fig. 5 by a further depression of the pedal, then the recess 39 is moved partly underneath the port 21 so that the port has a limited connection to the chamber 35. Likewise, the recess 41 is partly beneath the port 18 and the chamber 35 now has a throttled connection to the vacuum creating means and also a throttled connection of a similar extent with each vacuum chamber at the wheels. The pin 59 has now moved down the cam groove 60 and has opened the valve 51 so that air is admitted to the chamber 35 through the vent opening 50. The vent opening was closed during the initial opening of the ports 21 and 18, but as soon as these ports are opened to a sufficient extent to create a vacuum of the substantial degree on the chamber 35, the vent opening 50 is wide open, admitting air to the chamber 35, and this will maintain a constant degree of vacuum of relatively low pressure on the chambers at the wheels. When the parts are positioned as shown in Fig. 5, with the valve 51 substantially full open, a pressure is developed on the chambers at the wheels of from five to six inches of mercury. When the sleeve is shifted to the position shown in Fig. 6, then the ports 21 and 18 are wide open, and the valve 51 has closed the vent opening. In this position, a full maximum suction of the intake manifold is on the chamber 35 and the chambers at the wheels, and a maximum braking pressure is obtained at the wheels. The gradual shifting of the sleeve 22 from the position shown in Fig. 5 to the position shown in Fig. 6, will vary the degree of brake pressure on the wheels. As the ports 18 and 21 are opened, the valve vent opening 50 is closed. As the suction pull increases, the size of the vent opening decreases. The valve 51 is so proportioned and timed in its operation that the volume of air drawn in through the vent to the atmosphere and passing to the intake manifold is substantially constant, and therefore, the degree of vacuum on the manifold throughout the entire shifting of the pedal and the control of the brakes is maintained substantially at its normal degree of vacuum or suction. Furthermore, the cut-away portions 39 and 41 and the valve 51 controlling the vent opening are so proportioned and timed in their operation that varying degrees of vacuum are obtained on the chambers at the wheels for different settings of the control valves, and the degree of vacuum is maintained substantially constant for each selected setting of the valves.

From the above it will be apparent that when the valve controlling the connection to the manifold is brought to its initial open position, the vent to the atmosphere controlled by the metering pin or valve 51 is closed, and there will be a quick response in drawing a vacuum on the chambers. As the movement of the valve controlling the connection to the manifold is continued, the metering pin or valve 51 is shifted so as to open the vent until an initial braking pressure is developed, and from this time on, the shifting of the valve controlling the connection to the intake manifold to substantially full open position of the valve, the brake pressure is gradually increased. As the opening leading to the intake manifold increases, the vent opening is decreased in size, and thus the increments of brake pressure are substantially uniform, and a wide range of movement of the control pedal may be had in operating the braking means. In other words, by the usual shift of the brake pedal for bringing about braking conditions, any desired brake pressure may be obtained within the limits of the pressure that can be created by the vacuum creating means. Whatever the position the pedal may be shifted to, it will obtain a predetermined degree of vacuum and a predetermined brake pressure on the wheels which will be maintained constant so long as the brake pedal remains in the set position. The same is true on the release of the brake pedal.

When the sleeve moves from the position shown in Fig. 6 to the position shown in Fig. 7, the port 21 is partially closed, and this will throttle the suction on the chamber 35. The port 44 still remains closed to the atmosphere. The valve 51 still remains closed, as the member 29 has not yet shifted its position. A further release of the pedal will move the sleeve 22 and the member 29 so as to further throttle the connection to the intake manifold and open the valve 51. This will permit the lowering of the degree of vacuum on the chamber 35 and the brake pressure resulting therefrom. The opening 36 is of sufficient extent so that when the sleeve 22 and the member 29 are in the position shown in this figure, there is always a connection between the opening 38 and the chamber 35. A gradual release of the brake pedal will, therefore, produce a vacuum on the chambers at the wheels of a lesser degree, and will maintain said vacuum substantially constant at any setting to which the pedal is held. Therefore, the brake pressure on the wheels may be gradually increased or gradually decreased, and without completely releasing the chambers at the wheels to the atmosphere. The brake pressure may be released to a certain extent, and then again applied, so that the brake pressure is practically controlled by the position of the pedal as it is shifted through various increments of movement, on its downward movement applying the brake, or on its upward movement releasing the brake.

The control of the vacuum on a chamber by the improved valve mechanism described above may be used in connection with other mechanisms than braking mechanisms. The method and apparatus described broadly in this application is shown, described and claimed in a broader aspect, in my co-pending application Serial No. 597,359, filed of even date herewith.

While the valve mechanism has been shown wherein the valve parts move in right lines, it will be understood that this construction may be greatly modified and embodied in a mechanism having parts moving in other than straight lines without departing from the spirit of the invention as set forth in the appended claims. It will also be understood that the details of the valve parts may be greatly varied, and likewise the details of the control of the brakes at the wheels, without departing from the spirit of the invention as set forth in the appended claims.

Having thus described the invention, what I claim as new and desire to secure by Letters Patent, is:—

1. A vacuum controlled braking mechanism for a rotated part comprising a vacuum creating means maintaining substantially a constant degree of vacuum, a braking means, a chamber on which a vacuum is placed, a movable member controlled by the vacuum on said chamber and serving as the sole means for actuating said braking means, a connection between the chamber and the vacuum creating means, a valve controlling said connection, a connection between the chamber and the atmosphere, a valve controlling said last-named connection, and manual means for shifting said valves for inversely varying the size of the openings formed thereby throughout the greater portion of the range of shift of the valves, whereby the degree of vacuum on said chamber may be varied and maintained substantially constant by shifting the valves to different set positions.

2. A vacuum controlled braking mechanism for a rotated part comprising a vacuum creating means maintaining substantially a constant degree of vacuum, a braking means, a chamber on which a vacuum is placed, a movable member controlled by the vacuum on said chamber for actuating said braking means, a connection between the chamber and the vacuum creating means, a valve controlling said connection, a connection between the chamber and the atmosphere, a valve controlling said last-named connection, manual means for shifting said valves for inversely varying the size of the openings formed thereby throughout the greater portion of the range of shift of the valves, whereby the degree of vacuum on said chamber may be varied and maintained substantially constant by shifting the valves to different set positions, and means controlled by said manual means for connecting said chamber to the atmosphere for completely releasing the braking means when the valve controlling the opening to the vacuum creating means is closed.

3. A vacuum controlled braking mechanism for a rotated part comprising a vacuum creating means maintaining substantially a constant degree of vacuum, a braking means, a chamber on which a vacuum is placed, a movable member controlled by the vacuum on said chamber for actuating said braking means, a connection between the chamber and the vacuum creating means, a valve controlling said connection, a connection between the chamber and the atmosphere, a valve controlling said last-named connection, and manual means for shifting the valve controlling the opening leading to the vacuum creating means for gradually opening and closing the same, said valve controlling the connection to the atmosphere being normally closed when the braking means is released and shifted by said manual means to full open position during the initial opening of the valve controlling the connection to the vacuum creating means, and gradually to closed position as the valve controlling the opening to the vacuum creating means is gradually opened, whereby the degree of vacuum on said chamber during the closing of the valve controlling the connection to the atmosphere may be varied and maintained substantially constant for different set positions of said valve.

4. A vacuum controlled braking mechanism for a rotated part comprising a vacuum creating means maintaining substantially a constant degree of vacuum, a braking means, a chamber on which a vacuum is placed, a movable member controlled by the vacuum on said chamber for actuating said braking means, a connection between the chamber and the vacuum creating means, a valve controlling said connection, a connection between the chamber and the atmosphere, a valve controlling said last-named connection, manual means for shifting the valve controlling the opening leading to the vacuum creating means for gradually opening and closing the same, said valve controlling the connection to the atmosphere being normally closed when the braking means is released and shifted by said manual means to full open position during the initial opening of the valve controlling the connection to the vacuum creating means, and gradually to closed position as the valve controlling the opening to the vacuum creating means is gradually opened, whereby the degree of vacuum on said chamber during the closing of the valve controlling the connection to the atmosphere may be varied and maintained substantially constant for different set positions of said valve, and means controlled by said manual means for connecting said chamber to the atmosphere for completely releasing the braking means when the valve controlling the opening to the vacuum creating means is closed.

5. A vacuum controlled braking mechanism for a rotated part comprising a vacuum creating means maintaining substantially a constant degree of vacuum, a braking means, a chamber on which a vacuum is placed, a movable member controlled by the vacuum of said chamber for actuating said braking means, a connection between the chamber and the vacuum creating means, a valve controlling said connection, a connection between the chamber and the atmosphere, a valve controlling said last-named connection, manual means for shifting said valves for inversely varying the size of the openings formed thereby throughout the greater portion of the range of shift of the valves, whereby the degree of vacuum on said chamber may be varied and maintained substantially constant by shifting the valves to different set positions, and means controlled by said manual means for connecting said chamber to the atmosphere for completely releasing the braking means when the valve controlling the opening to the vacuum creating means is closed, and for closing said last-named opening to the atmosphere prior to the initial opening of the valve controlling the connection to the vacuum creating means.

6. A vacuum controlled braking mechanism for a rotated part comprising a vacuum creating means maintaining substantially a constant degree of vacuum, a braking means, a chamber on which a vacuum is placed, a movable member controlled by the vacuum on said chamber for actuating said braking means, a connection between the chamber and the vacuum creating means, a valve controlling said connection, a connection between the chamber and the atmosphere, a valve controlling said last-named connection, and manual means for shifting said valves for inversely varying the size of the openings formed thereby throughout the greater portion of the range of shift of the valves, whereby the degree of vacuum on said chamber may be varied and maintained substantially constant by shifting the valves to different set positions, and whereby the air passing to said vacuum creating means from the atmosphere through said chamber is maintained of substantially uniform volume for all settings of the valves through said range of shift.

7. A valve controlled braking mechanism for a motor vehicle comprising a braking means, a chamber on which a vacuum is placed, a movable member controlled by the vacuum on said chamber and serving as the sole means for actuating said braking means, a connection between said chamber and the intake manifold of the engine, a valve for controlling said connection, a connection between said chamber and the atmosphere, a valve for controlling said last-named connection, a manually operated pedal connected to said valves for shifting the same for inversely varying the size of the openings formed by said valves throughout the greater portion of the range of shift of the valves, whereby the degree of vacuum on said chamber may be varied and maintained substantially constant by shifting the valves to different set positions.

8. A valve controlled braking mechanism for a motor vehicle comprising a braking means, a chamber on which a vacuum is placed, a movable member controlled by the vacuum on said chamber and serving as the sole means for actuating said braking means, a connection between said chamber and the intake manifold of the engine, a valve for controlling said connection, a connection between said chamber and the atmosphere, a valve for controlling said last-named connection, a manually operated pedal connected to said valves for shifting the same for inversely varying the size of the openings formed by said valves throughout the greater portion of the range of shift of the valves, whereby the degree of vacuum on said chamber may be varied and maintained substantially constant by shifting the valves to different set positions, and means controlled by said pedal for connecting said chamber to the atmosphere for releasing the braking means when said pedal is released and the valve connecting the chamber to the intake manifold closed.

9. A valve controlled braking mechanism for a motor vehicle comprising a braking means, a chamber on which a vacuum is placed, a movable member controlled by the vacuum on said chamber and serving as the sole means for actuating said braking means, a connection between said chamber and the intake manifold of the engine, a valve for controlling said connection, a connection between said chamber and the atmosphere, a valve for controlling said last-named connection, a manually operated pedal connected to said valves for shifting the same for inversely varying the size of the openings formed by said valves throughout the greater portion of the range of shift of the valves, whereby the degree of vacuum on said chamber may be varied and maintained substantially constant by shifting the valves to different set positions, and means controlled by said pedal for connecting said chamber to the atmosphere for releasing the braking means when said pedal is released and the valve connecting the chamber to the intake manifold closed, and for closing said connection to the atmosphere upon the initial depression of the pedal and prior to the opening of the valve connecting said chamber to the intake manifold.

10. A valve controlled braking mechanism for a motor vehicle comprising a braking means, a chamber on which a vacuum is placed, a movable member controlled by the vacuum on said chamber and serving as the sole means for actuating said braking means, a connection between said chamber and the intake manifold of the engine, a valve for controlling said connection, a connection between said chamber and the atmosphere, a valve for controlling said last-named connection, a manually operated pedal connected to said valves for shifting the same for inversely varying the size of the openings formed by said valves throughout the greater portion of the range of shift of the valves, whereby the degree of vacuum on said chamber may be varied and maintained substantially constant by shifting the valves to different set positions, and whereby the air passing into the intake manifold from the atmosphere through said chamber is maintained of substantially uniform volume for all settings of the valves through said range of shift.

11. A vacuum controlled braking mechanism for a motor vehicle comprising a braking means, a chamber immediately associated with the braking means on which a vacuum is placed, said chamber having a movable member serving as the sole means for actuating the braking means, a connection between the chamber and the intake manifold including a valve chamber, a connection leading therefrom to the manifold, a valve for controlling said connection, a connection leading from said valve chamber to the chamber actuating the braking means, a connection leading from said chamber to the atmosphere, a valve for controlling said last-named connection, a manually operated pedal, a connection between said pedal and said valves for inversely varying the size of the openings formed by the valves throughout the greater portion of the range of shift of the valves, whereby the degree of vacuum on said valve chamber and the chamber operating the braking means may be varied and maintained substantially constant by shifting the valves to different set positions.

12. A vacuum controlled braking mechanism for a motor vehicle comprising a braking means, a chamber immediately associated with the braking means on which a vacuum is placed, said chamber having a movable member for actuating the braking means, a connection between the chamber and the intake manifold including a valve chamber, a connection leading therefrom to the manifold, a valve for controlling said connection, a connection leading from said valve chamber to the chamber actuating the braking means, a connection leading from said chamber to the atmosphere, a valve for controlling said last-named connection, a manually operated pedal, a connection between said pedal and said valves for inversely varying the size of the openings formed by the valves throughout the greater portion of the range of shift of the valves, whereby the degree of vacuum on said valve chamber and the chamber operating the braking means may be varied and maintained substantially constant by shifting the valves to different set positions, an independent opening leading from said valve chamber to the atmosphere, and a valve operated by the pedal for controlling said last-named opening, whereby said opening is closed when the pedal is depressed and the valves gradually opened for applying the braking means, and whereby said opening is opened and the braking means released when the pedal is released.

13. A vacuum controlled braking mechanism for a motor vehicle comprising a braking means, a chamber immediately associated with the braking means on which a vacuum is placed, said chamber having a movable member for actuating the braking means, a connection between the chamber and the intake manifold including a valve chamber, a connection leading therefrom to the manifold, a valve for controlling said connection, a connection leading from said valve chamber to the chamber actuating the braking means, a connection leading from said chamber to the atmosphere, a valve for controlling said last-named connection, a valve for controlling the connection leading from the valve chamber to the chamber for actuating the braking means, manually controlled means for simultaneously opening and closing the valves controlling the connection to the intake manifold and the connection to the chamber associated with the braking means and for opening the valve controlling the connection to the atmosphere during the initial opening of the valve controlling the connection to the intake manifold and for closing said valve controlling the connection to the atmosphere as the valve controlling the connection to the vacuum creating means is opened, whereby the degree of vacuum on the valve chamber and the chamber associated with the braking means may be varied and maintained substantially constant by the shifting of the valves to different set positions.

14. A vacuum controlled braking mechanism for a motor vehicle comprising a braking means, a chamber immediately associated with the braking means on which a vacuum is placed, said chamber having a movable member for actuating the braking means, a connection between the chamber and the intake manifold including a valve chamber, a connection leading therefrom to the manifold, a valve for controlling said connection, a connection leading from said valve chamber to the chamber actuating the braking means, a connection leading from said chamber to the atmosphere, a valve for controlling said last-named connection, a valve for controlling the connection leading from the valve chamber to the chamber for actuating the braking means, manually controlling means for simultaneously opening and closing the valves controlling the connection to the intake manifold and the connection to the chamber associated with the braking means and for opening the valve controlling the connection to the atmosphere during the initial opening of the valve controlling the connection to the intake manifold and for closing said valve controlling the connection to the atmosphere as the valve controlling the connection to the vacuum creating means is opened, whereby the degree of vacuum on the valve chamber and the chamber associated with the braking means may be varied and maintained substantially constant by the shifting of the valves to different set positions, said manual means operating to open said valve controlling the connection to the atmosphere as the first-named valves are closed, whereby the vacuum on the chamber associated with the braking means may be increased and maintained substantially constant for a selected setting of the valves without completely releasing the braking means.

FREDERICK L. SHELOR.